(12) United States Patent
Haemmerle et al.

(10) Patent No.: US 10,988,966 B2
(45) Date of Patent: Apr. 27, 2021

(54) FURNITURE DRIVE SYSTEM

(71) Applicant: Julius Blum GmbH, Hoechst (AT)

(72) Inventors: Kurt Haemmerle, Lustenau (AT); Matthias Grimm, Altach (AT)

(73) Assignee: Julius Blum GmbH, Hoechst (AT)

( * ) Notice: Subject to any disclaimer, the term of this patent is extended or adjusted under 35 U.S.C. 154(b) by 0 days.

(21) Appl. No.: 16/665,627

(22) Filed: Oct. 28, 2019

(65) Prior Publication Data

US 2020/0063484 A1 Feb. 27, 2020

Related U.S. Application Data

(63) Continuation of application No. PCT/AT2018/000046, filed on May 8, 2018.

(30) Foreign Application Priority Data

May 12, 2017 (AT) .............................. A 50405/2017

(51) Int. Cl.
*E05F 3/20* (2006.01)
*E05D 3/06* (2006.01)
(Continued)

(52) U.S. Cl.
CPC ................... *E05F 3/20* (2013.01); *E05D 3/06* (2013.01); *F16H 19/08* (2013.01); *E05F 15/63* (2015.01);
(Continued)

(58) Field of Classification Search
CPC ............... E05F 3/20; E05D 3/06; F16H 15/63
(Continued)

(56) References Cited

U.S. PATENT DOCUMENTS 8,011,741 B2  9/2011 Mattle
8,066,341 B2  11/2011 Brüstle
(Continued)

FOREIGN PATENT DOCUMENTS

CN   101142368   3/2008
CN   101675204   3/2010
(Continued)

OTHER PUBLICATIONS

International Search Report dated Aug. 23, 2018 in International (PCT) Application No. PCT/AT2018/000046.

*Primary Examiner* — James O Hansen
(74) *Attorney, Agent, or Firm* — Wenderoth, Lind & Ponack, L.L.P.

(57) ABSTRACT

A furniture drive system for a furniture part that is moveably mounted on a furniture body, includes a mechanical control unit having a pivotally mounted control arm for moving the moveable furniture part and at least one energy store for applying force to the control arm; an electric drive unit configured as a component designed to be separate from the mechanical control unit, and which has an electric motor for the electric motor-powered support of the movement of the moveable furniture part and a driver that can be driven by the electric motor for transmitting a torque of the electric motor to the mechanical control unit; and a damping device for damping the movement of the moveable furniture part. The damping device is arranged in the component of the electric drive unit for damping the movement of the moveable furniture part.

15 Claims, 4 Drawing Sheets

(51) Int. Cl.
 *F16H 19/08* (2006.01)
 *E05F 15/63* (2015.01)
 *F16H 19/00* (2006.01)

(52) U.S. Cl.
 CPC ... *E05Y 2201/216* (2013.01); *E05Y 2201/234* (2013.01); *E05Y 2900/20* (2013.01); *F16H 2019/008* (2013.01)

(58) Field of Classification Search
 USPC .......................... 312/319.1, 319.2, 323, 327
 See application file for complete search history.

(56) References Cited

U.S. PATENT DOCUMENTS

| | | | |
|---|---|---|---|
| 9,624,709 | B2 | 4/2017 | Friesenecker et al. |
| 2008/0122332 | A1 | 5/2008 | Brustle |
| 2010/0026153 | A1 | 2/2010 | Mattle |
| 2010/0162847 | A1 | 7/2010 | Gassner |
| 2010/0287073 | A1 | 11/2010 | Kocis et al. |
| 2010/0327717 | A1* | 12/2010 | Huber ............... E05F 15/63 312/319.5 |
| 2011/0138960 | A1* | 6/2011 | Omann .............. E05F 1/1058 74/490.07 |
| 2012/0032570 | A1* | 2/2012 | Friesenecker ......... E05F 15/63 312/319.6 |
| 2016/0333620 | A1* | 11/2016 | Holzapfel ............ E05F 1/1058 |
| 2019/0010747 | A1 | 1/2019 | Bohle |

FOREIGN PATENT DOCUMENTS

| | | |
|---|---|---|
| CN | 101809245 | 8/2010 |
| CN | 201933932 | 8/2011 |
| DE | 20 2006 006 190 | 10/2007 |
| EP | 3 124 729 | 2/2017 |
| JP | 2001-12145 | 1/2001 |
| JP | 2008-533342 | 8/2008 |
| JP | 2010-526225 | 7/2010 |
| JP | 2010-540801 | 12/2010 |
| JP | 2012-526326 | 10/2012 |
| JP | 2012-526928 | 11/2012 |
| KR | 10-1452688 | 10/2014 |
| WO | 2006/099645 | 9/2006 |
| WO | 2008/134786 | 11/2008 |
| WO | 2009/039541 | 4/2009 |
| WO | 2017/177247 | 10/2017 |

* cited by examiner

FURNITURE DRIVE SYSTEM

BACKGROUND OF THE INVENTION

The invention relates to a furniture drive system for a furniture part that is movably mounted on a furniture carcass, with a mechanical actuating unit. The drive system has at least one pivotably mounted actuating arm for moving the movable furniture part and at least one energy storage mechanism for applying force to the at least one actuating arm. An electric drive unit is designed as an assembly formed separate from the mechanical actuating unit and has at least one electric motor for the electromotive support of the movement of the movable furniture part and at least one driver, and can be driven by the at least one electric motor for transmitting a torque of the electric motor to the mechanical actuating unit. At least one damping device is provided for damping the movement of the movable furniture part. The invention furthermore relates to a piece of furniture with a furniture carcass, at least one furniture part that is movably mounted on the furniture carcass, and at least one such furniture drive system.

Furniture drive systems as generally described above are already known from the state of the art. In order to achieve as harmonic a movement of the movable furniture part as possible, one or more damping devices for damping the movement of the movable furniture part are provided. They serve in particular to damp the movement of the furniture part into the two end positions, thus the closed position and the completely open position.

In the case of the furniture drive systems which have on the one hand a mechanical actuating unit and on the other hand an electric drive unit, the electric drive unit is also often optionally omitted (i.e. only the mechanical actuating unit is used). In other words, during the purchase, a user can decide either to buy only the mechanical actuating unit or additionally also the electric drive unit. However, the additional use of the electric drive unit changes the demands on the damping of the movable furniture part.

For example, if the mechanical actuating unit were used without an electric drive unit, it would not be necessary to damp the movement of the furniture part into the completely open position since in this case it would be possible to design the at least one energy storage mechanism in such a way that the weight of the movable furniture part is perfectly compensated for by the at least one energy storage mechanism. If the electric drive unit is now added to the mechanical actuating unit, the electric drive unit moves the movable furniture part into the completely open position undamped. In this case, an additional damping would be desirable.

In order to accommodate this desire, two approaches are chosen in the state of the art. A first approach consists of actuating the at least one electric motor in such a way that a braking effect is achieved. However, this route is disadvantageous since in many cases it is desired to also equip the electric drive unit with a free-wheel clutch, for example to avoid injuries. If the speed of the electric motor were now reduced to achieve a braking effect, the free-wheel clutch would become active and disconnect the drive train.

A second approach consists of providing the mechanical actuating unit with a corresponding damping device. At the same time, however, the at least one energy storage mechanism must be modified in such a way that a force is exerted on the at least one actuating arm or the movable furniture part in the direction of the completely open position so that the movable furniture part, when operated without an electric drive unit, can be moved into the completely open position against the damping effect of the damping device, without a user having to apply an additional force. However, at the same time, this also means that a force exceeding the compensation of the weight of the movable furniture part is always exerted on the movable furniture part by the at least one energy storage mechanism. This is, in turn, disadvantageous as a user would often like to leave the movable furniture part in a particular position, which is, however, not possible since the at least one energy storage mechanism automatically moves the movable furniture part out of this position.

In the end, it is therefore attempted in the state of the art to find a compromise in relation to the at least one damping device which, on the one hand, allows for operation without an electric drive unit and, on the other hand, allows for operation with an electric drive unit. Disadvantages always arise.

SUMMARY OF THE INVENTION

The object of the present invention is to provide a furniture drive system that is improved compared with the state of the art, in which in particular the above-named disadvantages are at least partly avoided, as well as a piece of furniture with a furniture drive system improved in such a way.

In the case of the furniture drive system according to the invention, the at least one damping device for damping the movement of the movable furniture part is arranged in the assembly of the electric drive unit.

This has the advantage that, whenever the mechanical actuating unit is used together with the electric drive unit, the changed demands on the damping of the movement of the movable furniture part are automatically already accommodated without, in the case of a damping device provided in the mechanical actuating unit, a compromise having to be found, or two different mechanical actuating units having to be held in readiness, wherein one of the two actuating units is designed for operation without an electric drive unit and the other actuating unit is designed for operation with an electric drive unit. This is achieved in that, in addition to the electric drive unit, at least one damping device is automatically also added to the mechanical actuating unit.

A person skilled in the art has hitherto not taken such a solution into consideration as the preconception prevailed that all mechanical components, thus also the damping devices, are integrated in the mechanical actuating unit, and that the electric drive unit only comprises components which belong directly to the electromotive drive train. Breaking this strict separation is not obvious to a person skilled in the art.

The advantage according to the invention comes into play in particular where an opening damper is involved—as is provided in the case of a preferred embodiment. Thus, the advantage is achieved when the at least one damping device arranged in the assembly of the electric drive unit can be acted upon only over a partial range of the movement of the pivotably mounted actuating arm, preferably wherein the partial range is arranged between a position of the pivotably mounted actuating arm which corresponds to a partially open position of the movable furniture part and a position of the pivotably mounted actuating arm which corresponds to a completely open position of the movable furniture part.

Equipping the electric drive unit with at least one damping device does not rule out the mechanical actuating unit also comprising at least one damping device. In particular, the mechanical actuating unit also comprises at least one damping device for damping the movement of the movable furniture part, which can preferably be acted upon at least in a partial range between a position of the pivotably mounted actuating arm which corresponds to a closed position of the movable furniture part and a position of the pivotably mounted actuating arm which corresponds to a partially open position of the movable furniture part before the closed position.

The at least one damping device arranged in the assembly of the electric drive unit can be acted upon in different ways. A particularly preferred embodiment consists of a gear mechanism being provided between the at least one electric motor and the at least one driver, and the at least one damping device arranged in the assembly of the electric drive unit being able to be acted upon by a part of the gear mechanism which preferably has a pivotably mounted lever, which is in contact with the damping device or can be brought into contact with the damping device. Acting upon the at least one damping device via the gear mechanism on the one hand achieves a compact design. On the other hand, the application is effected particularly efficiently since the force for the application can be tapped at a suitable point of the gear mechanism.

The at least one gear mechanism can comprise at least two gear stages, a free-wheel clutch and/or an overload clutch.

Alternatively or in addition to the application via the gear mechanism, the mechanical actuating unit comprises at least one actuator, and the at least one damping device arranged in the assembly of the electric drive unit can be acted upon by the actuator of the mechanical actuating unit.

Further advantageous embodiments include the mechanical actuating unit having at least one movably mounted actuating part for transmitting a force from the at least one energy storage mechanism to the at least one actuating arm. The at least one actuating part has at least one transmission opening, in which the at least one driver that can be driven by the at least one electric motor engages or can engage, reference is made to the disclosure content of the international patent application with the file reference PCT/AT2017/060027.

As stated at the beginning, protection is also sought for a piece of furniture with a furniture carcass, at least one furniture part that is movably mounted on the furniture carcass, and at least one furniture drive system according to one of the preceding claims for the at least one furniture part, preferably wherein the at least one movable furniture part is pivotable about a horizontal axis.

BRIEF DESCRIPTION OF THE DRAWINGS

Further details and advantages of the invention are explained in more detail below with reference to the drawings in which:

FIG. 5b is a cross-sectional representation along the section plane 39 drawn in in FIG. 5a.

DETAILED DESCRIPTION OF THE INVENTION

Figure 1A:
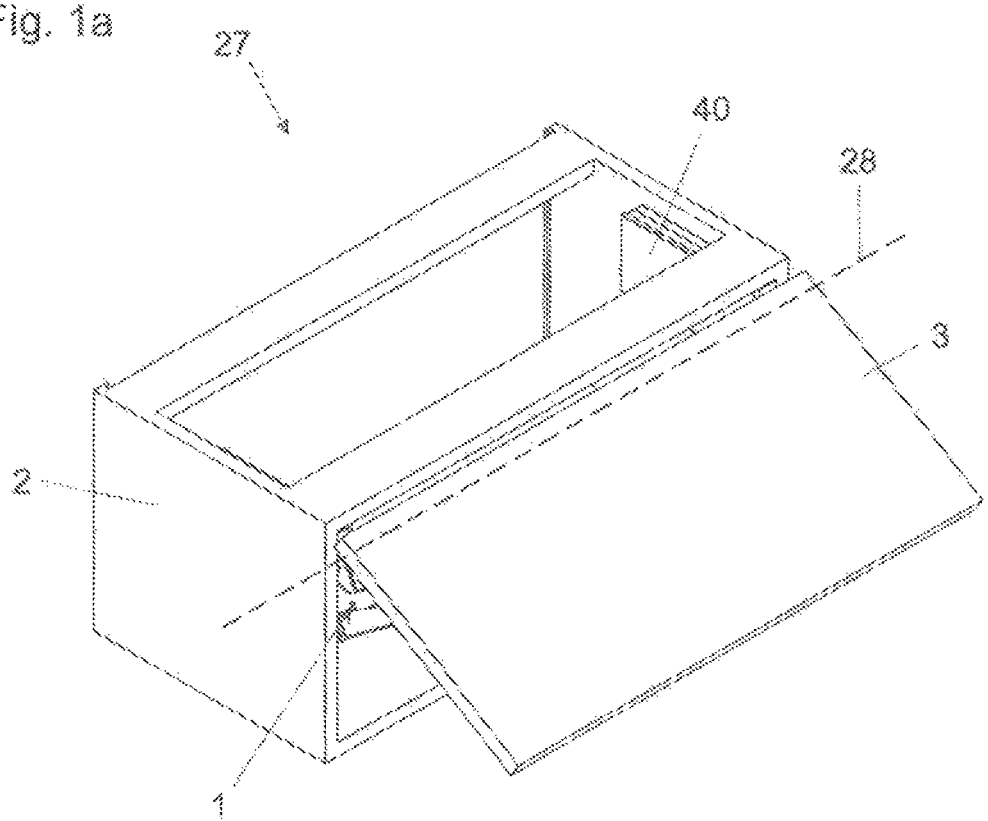
FIG. 1a shows a piece of furniture with a movably mounted furniture part in the form of a furniture flap that is pivotable about a horizontal axis in a perspective view.

FIG. 1a shows a piece of furniture 27 in the form of a wall unit, wherein the piece of furniture 27 has a furniture carcass 2. A furniture part 3 in the form of a flap is movably mounted on the furniture carcass 2. The furniture part 3 is pivotable about a horizontal pivot axis 28. The furniture carcass 2 comprises two side panels, on each of which is arranged a furniture drive system 1 according to a preferred embodiment. The furniture part 3 is not represented in FIG. 1b.

According to the preferred embodiment, the furniture drive system 1 is therefore designed to drive a flap 3 that is mounted pivotable about a horizontal axis 28. However, the furniture drive system can just as well also be used to drive a furniture door that is mounted pivotable about a vertical axis. For this, only slight modifications would be necessary, if any.

Figure 1B:
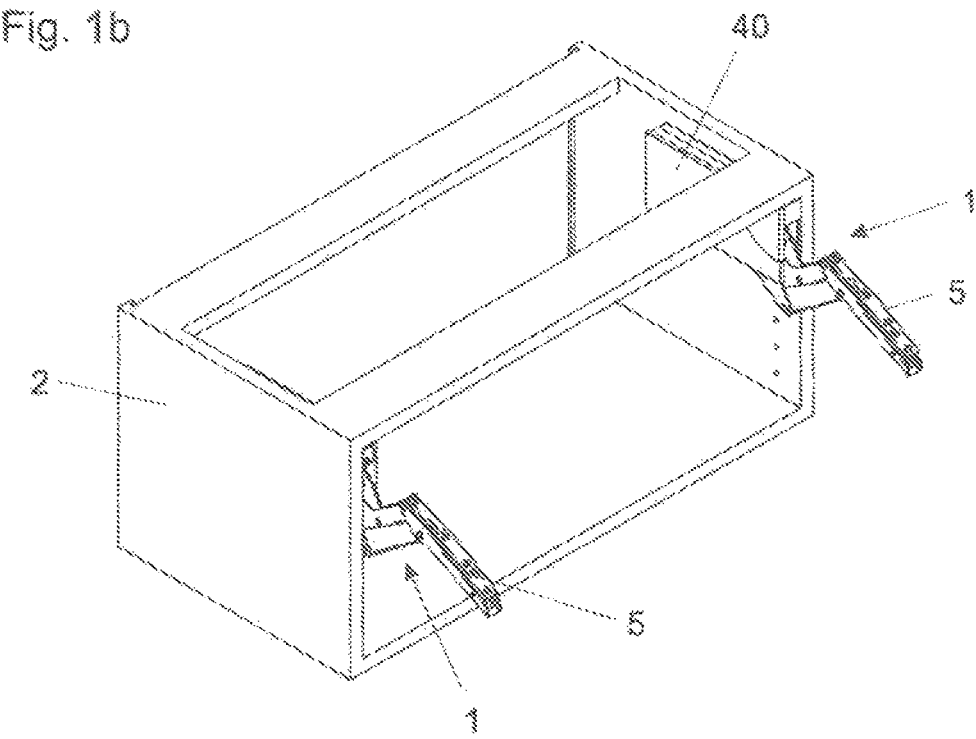
FIG. 1b shows the piece of furniture according to FIG. 1a, wherein the movable furniture part has been omitted in the representation.
Figure 2:
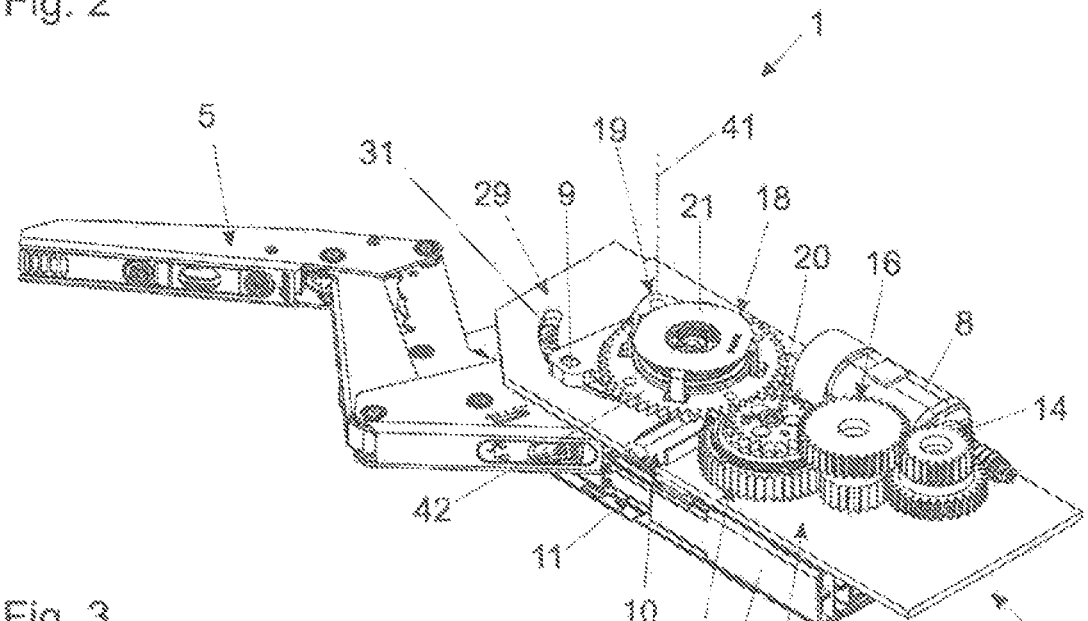
FIG. 2 shows the furniture drive system according to the invention according to a preferred embodiment example in a perspective view.

FIG. 2 shows the furniture drive system 1 in a detailed representation, wherein the cover 40 to be seen in FIGS. 1a and 1b has been omitted. For one thing, the furniture drive system 1 comprises a mechanical actuating unit 4, and an electric drive unit 7, which is designed as an assembly formed separate from the mechanical actuating unit 4.

The electric drive unit 7 comprises an electric motor 8 for the electromotive support of the movement of the movable furniture part 3, which, as can be seen in FIG. 1a, can be fastened to the actuating arm 5. Furthermore, the electric drive unit 7 comprises a driver 9, that can be driven by the electric motor 8, for transmitting a torque of the electric motor 8 to the mechanical actuating unit 4 or to the actuating arm 5, and a furniture part 3 optionally connected thereto.

The mechanical actuating unit 4 and the electric drive unit 7 can be detachably connected to each other. The electric drive unit 7 can thereby be connected to the mechanical actuating unit 4, or separated from it, in a simple manner.

The components of the electric drive unit 7 can be arranged on a mounting plate 29, as represented. The mounting plate 29 rests against the mechanical actuating unit 4 at least in some areas. In the embodiment represented, the mounting plate 29 separates the mechanical actuating unit 4 from the assembly of the electric drive unit 7.

In place of a mounting plate 29, a housing can for example also be used, which substantially encloses the assembly of the electric drive unit 7.

Between the electric motor 8 and the driver 9, a gear mechanism 12 is provided to convert a torque of the electric motor 8 into a pivoting movement of the driver 9 about an axis of rotation 41. The gear mechanism 12 comprises several, specifically five, gear stages 14, 16, 17, 18 and 19. The gear stages mesh with each other in each case via gear teeth. Furthermore, the gear mechanism 12 comprises a free-wheel clutch 20, which is integrated in gear stage 17, as well as an overload clutch 21, which is integrated in gear stage 18.

In the embodiment represented, the driver 9 is formed as a pin mounted displaceable in a delimited manner in a guide contour 31 formed in the mounting plate 29. The driver 9 projects above the mounting plate 29 on the side which is opposite the side on which the electric motor 8 is arranged.

Figure 3:
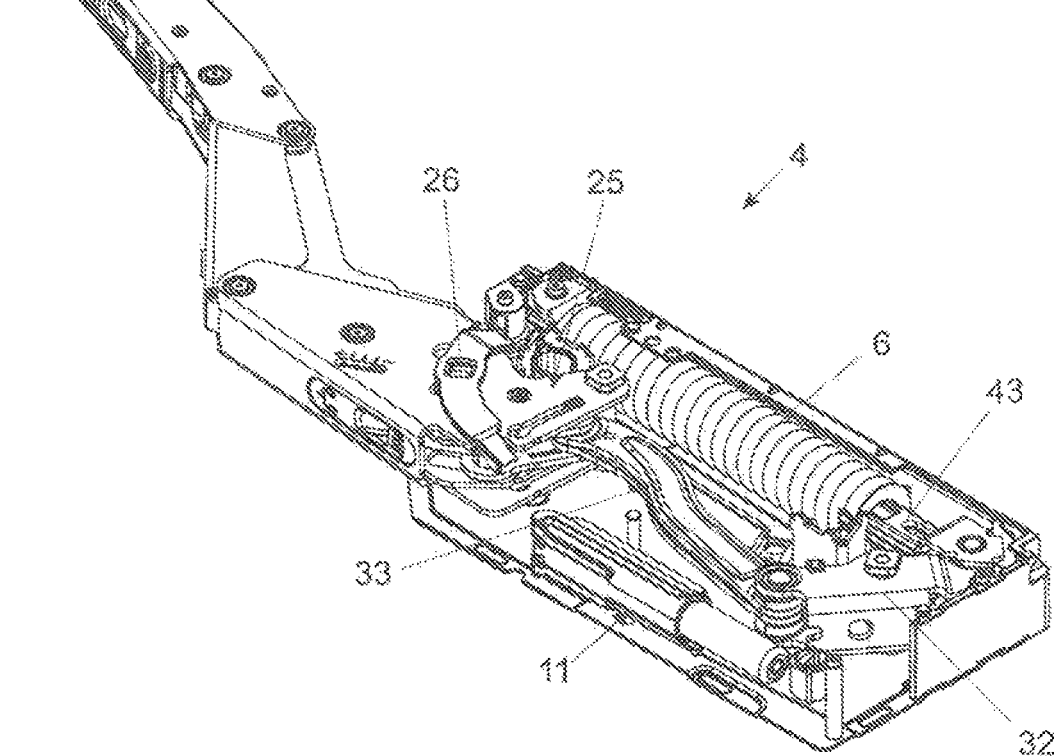
FIG. 3 shows the mechanical actuating unit of the furniture drive system according to the preferred embodiment example in a perspective view.

FIG. 3 shows details of the mechanical actuating unit 4, wherein sections of the housing of the mechanical actuating unit 4 have been omitted in the representation. This relates, for example, to the housing 30 of the damping device 11 provided in the mechanical actuating unit 4.

The mechanical actuating unit 4 comprises a pivotably mounted actuating arm 5 for moving the movable furniture part 3 and an energy storage mechanism 6 for applying force to the at least one actuating arm 5.

The actuating arm 5 is formed as an articulated lever, which comprises several pivot points.

The energy storage mechanism 6 is formed as a spring device. Specifically, it can be a compression spring, which is arranged on a spring guide 43. In the embodiment represented, the energy storage mechanism 6 substantially serves to compensate for the weight of the furniture part 3.

The force that can be stored in the energy storage mechanism 6 is transmitted to the actuating arm 5 via deflection levers 32 and 33.

Furthermore, the mechanical actuating unit 4 comprises a movably mounted actuating part 25 for transmitting a force from the energy storage mechanism 6 to the actuating arm 5. The actuating part 25 has a transmission opening 26, in which the driver 9 that can be driven by the electric motor 8 engages or can engage. A torque of the electric motor 8 is thus transmitted to the mechanical actuating unit 4 or the actuating arm 5 of the mechanical actuating unit 4 via the driver 9.

Although this is not realized in the embodiment represented, a protruding driver, which engages in an opening in the gear mechanism of the electric drive unit 7, can be formed on the mechanical actuating unit 4.

The mechanical actuating unit 4 comprises a damping device 11 for damping the movement of the movable furniture part 3. The damping device 11 is formed as a linear dashpot (damper) and functions as a closing damper. This means that the damping device 11 can be acted upon at least in a partial range between a position of the pivotably mounted actuating arm 5 which corresponds to a closed position of the movable furniture part 3 and a position of the pivotably mounted actuating arm 5 which corresponds to a partially open position of the movable furniture part 3 before the closed position. The damping device 11 therefore makes soft closing of the movable furniture part 3 possible. Alternatively or in addition to the linear dashpot (linear damper), a rotary dashpot (rotary damper) can also be used.

According to the invention, the furniture drive system 1 has a damping device 10 for damping the movement of the movable furniture part 3, wherein this damping device 10 is arranged in the assembly of the electric drive unit 7.

A preferred embodiment is represented in particular in FIGS. 4a, 4b, 5a and 5b. For better understanding compared with FIG. 2, part of gear stage 18 has been omitted. The damping device 10 can be acted upon by an actuating part 13 of the gear mechanism 12, wherein this actuating part 13 has a pivotably mounted lever 15, which can be brought into contact with the damping device 10. The actuating part 13 is a component part of gear stage 18, which co-operates on one side with gear stage 17 and on the other side with gear stage 19. Further component parts of gear stage 18 are a gear wheel 42 connected to the actuating part 13 in a rotationally fixed manner, and an overload clutch 21 (compare FIG. 2).

The damping device 10 can also be acted upon by another part of the gear mechanism 12. However, alternatively or in addition to this, the mechanical actuating unit 4 can include at least one actuator, and the damping device 10 arranged in the assembly of the electric drive unit 7 can be acted upon by the at least one actuator of the mechanical actuating unit 4. In this case, although the damping device 10 may be arranged in the assembly of the electric drive unit 7, it need not be acted upon by a part of the drive train of the electric drive unit 7.

The damping device 10 is formed as a linear dashpot (linear damper) with a cylinder 22 and a piston 23 movable relative thereto, wherein a stop 24 for acting on the linear dashpot is arranged on the cylinder 22. Alternatively or in addition to the linear dashpot, a rotary dashpot (rotary damper) can also be used.

Figure 4A:
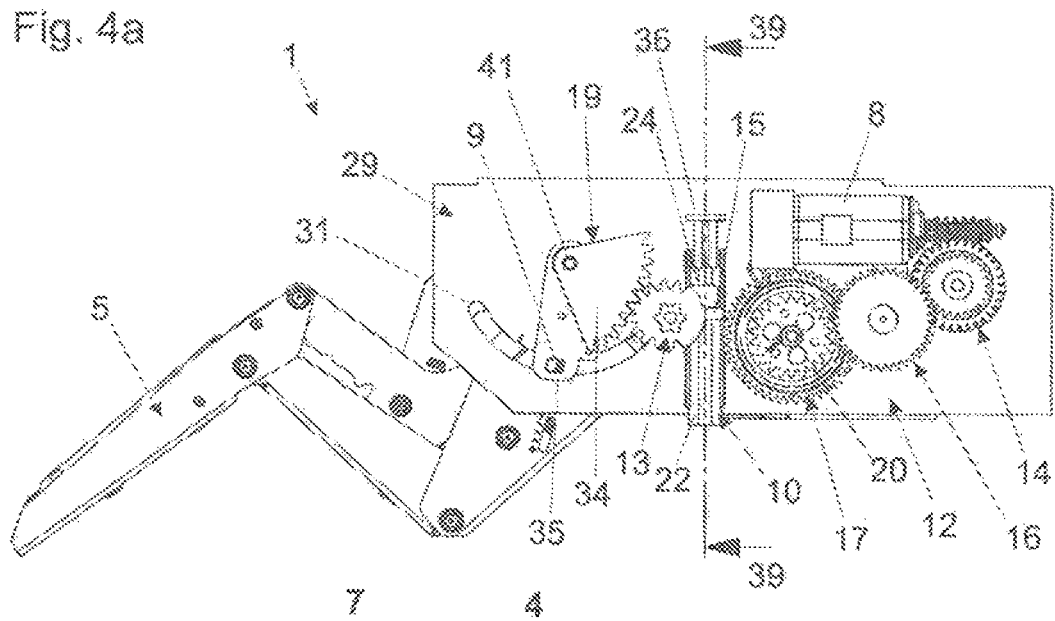
FIG. 4a shows the furniture drive system according to the invention according to the preferred embodiment example in a view from the side, wherein a part of the gear mechanism has been omitted in the representation and the actuating arm is located in a partially open position.
Figure 4B:
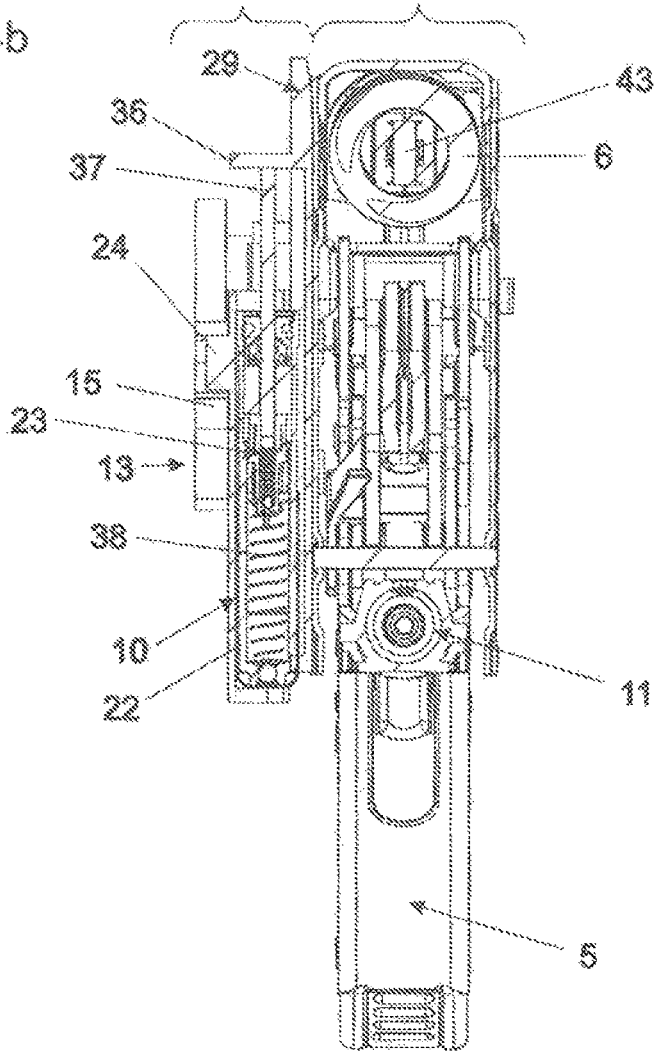
FIG. 4b is a cross-sectional representation along the section plane 39 drawn in in FIG. 4a, FIG. 5a shows the furniture drive system according to the invention according to the preferred embodiment in a view from the side, wherein a part of the gear mechanism has been omitted in the representation and the actuating arm is located in the completely open position.
Figure 5A:
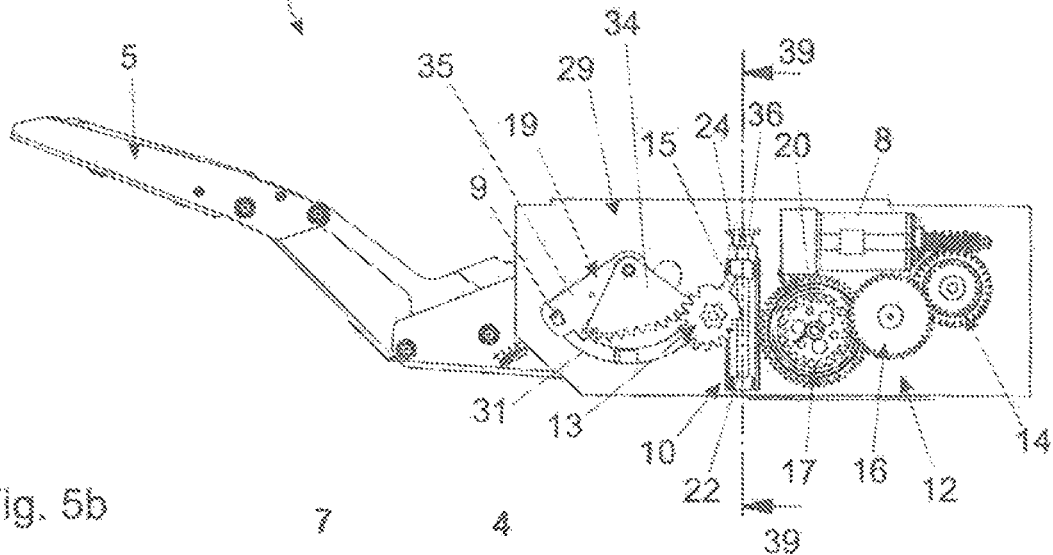
Figure 5B:
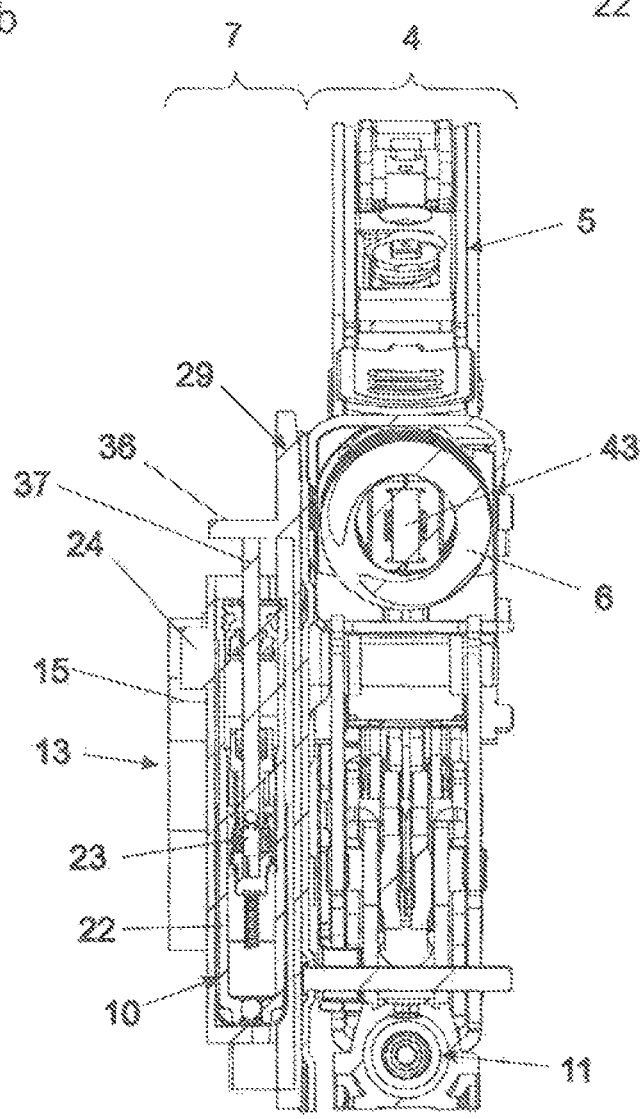

FIGS. 4a and 4b show a position of the actuating arm 5 in which, in the case of a movement starting from the closed position, the lever 15 on the gear mechanism actuating part 13 strikes the stop 24 on the cylinder 22. Up to this position, the lever 15 and the stop 24, or generally speaking the gear mechanism 12 and the damping device 10, are not in contact. Starting from the position shown in FIGS. 4a and 4b, in the direction of the completely open position, which is shown in FIGS. 5a and 5b, the lever 15 always rests against the stop 24. This means that the damping device 10 arranged in the assembly of the electric drive unit 7 can be acted upon only over a partial range of the movement of the pivotably mounted actuating arm 5. In this regard, the partial range is arranged between a position of the pivotably mounted actuating arm 5 which corresponds to a partially open position of the movable furniture part 3 and a position of the pivotably mounted actuating arm 5 which corresponds to a completely open position of the movable furniture part 3.

The damping device 10 arranged in the assembly of the electric drive unit 7 in the preferred embodiment therefore functions as an opening damper, which ensures that the movable furniture part 3 is moved smoothly into the completely open position. However, this opening damping only takes place when the mechanical actuating unit 4 is operated together with the electric drive unit 7, since the damping device 10 is an integral component part of the electric drive unit 7 and is thus added to the mechanical actuating unit 4 together with it. If the electric drive unit 7 is removed, at the same time the damping device 10 is also removed and the mechanical actuating unit 4 comprises only the further damping devices optionally provided in the mechanical actuating unit. In this way, it is possible to accommodate changes in the demands on the damping effect which result from the addition of the electric drive unit in a targeted manner.

From the cross-sectional representation according to FIG. 4b, it can be seen that the damping device 10 comprises a return spring 38 which conveys the damping device 10 into the starting position again once the damping stroke is completed, with the result that the damping device 10 is ready for a further damping stroke again.

Furthermore, it emerges from the cross-sectional representations according to FIGS. 4b and 5b that the piston 23 is connected to a piston rod 37, which braces itself against a stop 36, which is formed on the mounting plate 29. During the damping stroke, the cylinder 22 therefore moves relative to the stationary piston 23. The reverse kinematic solution is also possible, however. In particular, during the damping stroke, the cylinder can remain at rest and the piston can move relative thereto. For this, for example, the end of the piston rod could be acted upon by a part of the gear mechanism 12.

FIGS. 5*a* and 5*b* show the furniture drive system 1 in the completely open position. A comparison with FIGS. 4*a* and 4*b* shows that the cylinder 22 of the damping device 10 has moved relative to the piston 23. This movement was caused by a rotational movement of the actuating part 13 of the gear mechanism 12 or of the lever 15 connected to it, which is in contact with the stop 24 on the cylinder 22. This means that the movement of the actuating arm 5 or of a furniture part 3 connected to it into the completely open position has been damped by the damping device 10.

Alternatively or in addition to the opening damper, the electric drive unit can also comprise one or more additional damping devices, which damp other partial movements of the actuating arm 5 or of a furniture part 3 connected to it.

LIST OF REFERENCE NUMBERS

1 furniture drive system
2 furniture carcass
3 furniture part
4 mechanical actuating unit
5 actuating arm
6 energy storage mechanism
7 electric drive unit
8 electric motor
9 driver
10 damping device
11 damping device
12 gear mechanism
13 part of the gear mechanism
14 gear stage
15 lever
16 gear stage
17 gear stage
18 gear stage
19 gear stage
20 free-wheel clutch
21 overload clutch
22 cylinder
23 piston
24 stop
25 actuating part
26 transmission opening
27 piece of furniture
28 horizontal axis
29 mounting plate

The invention claimed is:

1. A furniture drive system for driving a furniture part that is movably mounted on a furniture carcass, the furniture drive system comprising:
   a mechanical actuating unit including a pivotably mounted actuating arm for moving the movable furniture part, and an energy storage mechanism for applying force to the actuating arm;
   an electric drive unit configured as an assembly formed separate from the mechanical actuating unit, the electric drive unit including an electric motor for electromotive support of a movement of the movable furniture part and a driver to be driven by the electric motor to transmit a torque of the electric motor to the mechanical actuating unit; and
   a first damping device for damping the movement of the movable furniture part, the first damping device being arranged in the assembly of the electric drive unit and being a mechanical damping device;
   wherein the mechanical actuating unit includes a second damping device for damping the movement of the movable furniture part.

2. The furniture drive system according to claim 1, wherein a gear mechanism is provided between the electric motor and the driver, and the first damping device is configured to be acted upon by a part of the gear mechanism.

3. The furniture drive system according to claim 2, wherein the gear mechanism comprises at least two gear stages and one of (i) a free-wheel clutch, (ii) an overload clutch, or (iii) a free-wheel clutch and an overload clutch.

4. The furniture drive system according to claim 2, wherein the part of the gear mechanism has a pivotably mounted lever configured to be in contact with the damping device or to be brought into contact with the damping device.

5. The furniture drive system according to claim 1, wherein the first damping device is configured to be acted upon only over a partial range of the movement of the pivotably mounted actuating arm.

6. The furniture drive system according to claim 5, wherein the partial range is arranged between a position of the pivotably mounted actuating arm corresponding to a partially open position of the movable furniture part and a position of the pivotably mounted actuating arm corresponding to a completely open position of the movable furniture part.

7. The furniture drive system according to claim 1, wherein the second damping device is configured to be acted upon at least in a partial range between a position of the pivotably mounted actuating arm which corresponds to a closed position of the movable furniture part and a position of the pivotably mounted actuating arm which corresponds to a partially open position of the movable furniture part before the closed position.

8. The furniture drive system according to claim 1, wherein the first damping device comprises at least the linear damper, and further comprises a stop on the cylinder for acting on the linear damper.

9. The furniture drive system according to claim 1, wherein the mechanical actuating unit and the electric drive unit are detachably connected to each other.

10. The furniture drive system according to claim 1, wherein the mechanical actuating unit has a movably mounted actuating part for transmitting a force from the energy storage mechanism to the actuating arm, the actuating part having a transmission opening to be engaged by driver to be driven by the electric motor.

11. The furniture drive system according to claim 1, wherein the electric drive unit further includes a mounting plate on which the electric motor is arranged, the mounting plate resting against the mechanical actuating unit.

12. The furniture drive system according to claim 1, wherein the energy storage mechanism is formed as a spring device.

13. A piece of furniture comprising:
   a furniture carcass;
   a furniture part movably mounted on the furniture carcass; and
   the furniture drive system according to claim 1 for moving the furniture part.

14. The piece of furniture according to claim 13, wherein the movable furniture part is pivotable relative to the furniture carcass about a horizontal axis.

15. The furniture drive system according to claim 1, wherein the first damping device comprising one of (i) a linear damper comprising a cylinder and a piston movable relative to the cylinder, (ii) a rotary damper, or (iii) a linear damper comprising (a) a cylinder and (b) a piston movable relative to the cylinder, and a rotary damper.

\* \* \* \* \*